C. Perkes,
Pipe Coupling.
No. 101,501. Patented Apr. 5. 1870.
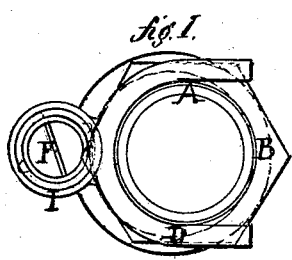
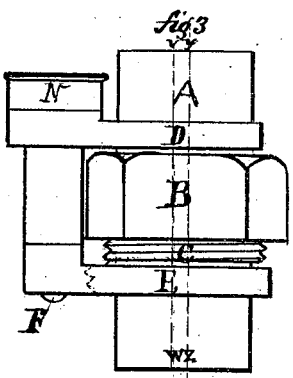
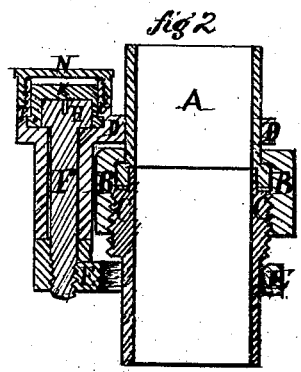
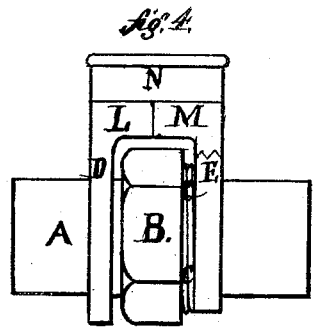
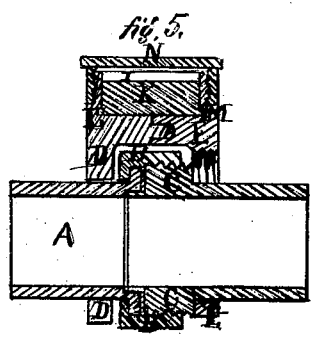
Witness.
Wm. H. King
E. H. Graham
Charles Perkes

United States Patent Office.

CHARLES PERKES, OF PHILADELPHIA, PENNSYLVANIA.

Letters Patent No. 101,501, dated April 5, 1870.

SEALING-APPARATUS FOR PIPE-JOINT COUPLINGS.

The Schedule referred to in these Letters Patent and making part of the same.

*To all whom it may concern:*

Be it known that I, CHARLES PERKES, brass-founder and finisher, of the city and county of Philadelphia, and State of Pennsylvania, have invented a new and useful device for Sealing the Union-Joints or Couplings of Pipes so as to prevent the fraudulent disconnection and subsequent reconnection thereof without detection; and I do hereby declare the following to be a full, clear, and exact description thereof, reference being had to the accompanying drawings and letters of reference marked thereon.

The nature of my invention consists in so forming and applying two collars to the necks or smaller portions of the two members of the coupling, and subsequently uniting them and fixing a seal upon the point of union thereof, that, while it is impossible to disconnect the joint and again connect it without defacing the seal, it is at the same time practicable to screw up or tighten the joint without injuring the seal.

My invention may be usefully applied to fluid-meters used for spirits, oil, water, or gas, to prevent fraudulent use of the fluid by not passing through the meter.

Figure 1 shows a plan of my invention;
Figure 2, a vertical section;
Figure 3, a side elevation;
Figure 4, a modified form in side elevation, and
Figure 5, the same in vertical section.

The same letters of reference apply to the same parts in the several figures.

A represents the swivel;
B the nut, and
C the male screw of a union-joint or coupling, to which this device is applied.

D represents a collar either entirely or partially encircling, and neatly but not tightly fitting the neck or smaller portion of the swivel A, and E represents another collar encircling the neck of the male-screw G, over which it is screwed, being threaded internally.

A bolt or screw, F, passing through the bottom of the cup I formed on the collar D, unites the collar D to the collar E by screwing into the lug G formed upon the collar E.

The circles of the collars D and E are not concentric with each other, but are made eccentric, so that the collar E cannot, when the screw F is in position, be unscrewed over the male screw G.

The axis of the collar E is shown by the dotted line V W, and the axis of the collar D by the dotted line Y Z.

A segment of a collar, as shown in fig. 1, may be advantageously used instead of the collar D, and is more readily applied to couplings already in use.

The cup I is made largest in diameter, and of other form than circular at the bottom, so as to prevent the seal K which covers the head H of the screw or bolt F from being raised from it or turned in it without breaking.

The nut B may be tightened without injury to the seal.

In the form shown in figs. 4 and 5, the cup I for containing the seal is made partly in the lugs L and M of the collars D and E. No bolt is used in this arrangement, but a cap, N, is useful to protect the seal from accidental injury.

This last-described form of my invention is more conveniently applicable to horizontal pipes than the one first described.

I am aware that union-joints have often been sealed so as to prevent rotation of the nut thereof without detection. This I distinctly disclaim; but in no case do I believe that seals have been applied to collars surrounding the necks of couplings or union-joints so as to permit the rotation of the nut for the purpose of tightening the joint.

What I claim as my invention, and desire to secure as such by Letters Patent, is—

The combination of the seal with the collars or collar and segment of a collar applied to the necks of union-joints, as described and shown.

CHARLES PERKES.

Witnesses:
WM. H. KING,
E. H. GRAHAM.